Patented Sept. 23, 1952

2,611,787

UNITED STATES PATENT OFFICE 2,611,787

FLUOROCARBON ORTHO ESTERS

Torkil Holm, Minneapolis, Minn., assignor to Minnesota Mining & Manufacturing Company, St. Paul, Minn., a corporation of Delaware No Drawing. Application May 19, 1951, Serial No. 227,285

1 Claim. (Cl. 260—615)

This invention relates to my discovery of a new and useful class of fluorocarbon esters, namely, the hydrocarbon orthoesters of the fluorocarbon mono-carboxylic acids; having the formula:

$$R_fC(OR)_3$$

where $R_f$ is a saturated fluorocarbon radical (consisting solely of carbon and fluorine), and R is a hydrocarbon radical.

Of particular interest are the hydrocarbon orthoesters of the perfluoroalkyl mono-carboxylic acids shown by the formula:

$$C_nF_{2n+1}C(OR)_3$$

where R is a methyl ($CH_3$—), ethyl ($C_2H_5$—), propyl ($C_3H_7$—) or butyl ($C_4H_9$—) group, and $n$ has an integer value of 1 to 11.

I have discovered that these new compounds can be made by a new process as indicated by the following reactions:

(1) 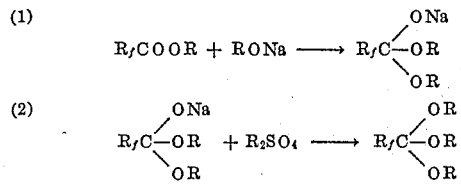

(2)

This process is of particular utility in the preparation of the subject compounds in view of the fact that to the best of my knowledge, there is no other known process by which they can be made. Attempts to make these compounds by methods ordinarily employed for making hydrocarbon orthoesters met with failure. As example, one reaction described by McElvain and Nelson (J. Am. Chem. Soc. 64, 1825 (1942)):

$$RCN + EtOH + HCl \rightarrow RC(OEt)=NH \cdot HCl$$
$$RC(OEt)=NH \cdot HCl + EtOH \rightarrow RC(OEt)_3 + NH_4Cl$$

when tried with fluorocarbon acid esters, did not produce the desired orthoester of the perfluoro acid but instead, the corresponding perfluoro amide, $R_fCONH_2$.

As a matter of interest, the process for producing these new orthoesters was unexpectedly discovered during the course of an attempted Claisen condensation experiment involving equimolar quantities of ethyl trifluoroacetate and ethyl acetate:

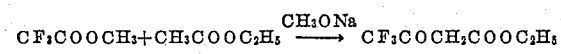

During the process of adding sodium methylate to the methyl perfluoroacetate (and without the addition of the ethyl acetate) a solid material was obtained. No reaction had been anticipated at this point. This solid material upon reaction with methyl sulfate was found to yield a product which upon analysis proved to be $CF_3C(OCH_3)_3$. The reactions which actually occurred may be written thusly:

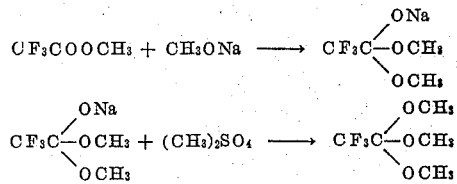

Consequent work with esters of other perfluoro acids produced the corresponding higher homologues.

The simple orthoesters of any of the perfluoro acids, whether mono or dibasic, cyclic or non-cyclic can be produced by the above described method. Likewise, the formation of polyorthoesters using the appropriate starting materials is feasible, said polyorthoesters being derived from either mono or dibasic perfluoro acids and the appropriate di- or polyhydric reactants.

I have already indicated that the preferred orthoesters contain lower alkyl groups such as methyl, ethyl, propyl or butyl. However, it should be obvious that orthoesters can be prepared by this process from the higher alkyl groups. Likewise, depending upon the choice of the ester of the perfluoro acid, the metal alkoxide and the alkylating agent, different alkyl groups may be had in the final product as exemplified by the formula:

By using the appropriate alkylating agent, unsaturated hydrocarbon groups such as the allyl group can be incorporated in these compounds.

The experimental procedure used in the preparation of my orthoesters is very simple and easily described. The one presented herewith is the standard procedure used throughout my work.

To a stirred suspension of 1.0 mol (54 g.) of sodium methoxide in 250 ml. of dry ether was added, dropwise, 1 mol of a simple ester of a perfluoro acid and a hydrocarbon alcohol. After 30 minutes, one mol of the appropriate dialkylsulfate (alkylating agent) was added with continuous stirring. The mixture was stirred for 4 hours then left to stand over night. The sodium sulfate which formed was removed by filtration and the orthoester was isolated by fractionation of the ether solution.

The methyl orthoester of trifluoroacetic acid, $CF_3C(OCH_3)_3$, boils at 106° C. at 740 mm. pressure, has a refractive index, $n_D^{25}$, of 1.3380, and a freezing point of about minus 55° to 53° C. Elemental analysis indicated 34.6% carbon as compared with a theoretical percentage of 34.5, and 32.7% fluorine, with 32.7% as theoretical. Infrared analyses showed the absence of hydroxyl and carbonyl groups.

Higher molecular weight orthoesters were prepared including methyl orthoperfluoropropionate, $CF_3CF_2C(OCH_3)_3$, having a boiling point of about 116° C. at 740 mm. pressure, and methyl orthoperfluorobutyrate, $CF_3CF_2CF_2C(OCH_3)_3$, with a boiling point of approximately 142° C. at 740 mm. Approximate refractive indices, $n_D^{25}$, for these compounds are 1.3289 and 1.3207, respectively.

Other alkylating agents can be used such as the alkyl phosphates and alkyl halides such as the bromides and iodides. Alkali-metal alcoholates other than sodium alcoholates can be used.

I claim:

The new and useful compounds of the class consisting of the methyl, ethyl, propyl and butyl orthoesters of perfluoro-alkyl mono-carboxylic acids, represented by the formula:

$$C_nF_{2n+1}C(OR)_3$$

where $n$ has an integer value of 1 to 11 and "R" is the alkyl hydrocarbon group.

TORKIL HOLM.

REFERENCES CITED

The following references are of record in the file of this patent:

UNITED STATES PATENTS

| Number | Name | Date |
|---|---|---|
| 2,411,158 | Hanford | Nov. 19, 1946 |
| 2,454,663 | McGinty | Nov. 23, 1948 |
| 2,567,011 | Diesslin et al. | Sept. 4, 1951 |

OTHER REFERENCES

Simons, Fluorine Chemistry, vol. 1 (1950), pages 487–8.

Post, The Chemistry of Aliphatic Ortho-Esters (1943), pages 32 and 36.

Henne et al., Jour. Am. Chem. Soc., vol. 69 (1947), pages 1819–20.